US006934381B1

(12) United States Patent
Klein et al.

(10) Patent No.: US 6,934,381 B1
(45) Date of Patent: Aug. 23, 2005

(54) CONTACT ROUTING SYSTEM AND METHOD

(75) Inventors: John Klein, Dracut, MA (US); RagHurama Bhat, Sunnyvale, CA (US); Yannis Cosmadoupoulos, San Francisco, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/374,646

(22) Filed: Aug. 16, 1999

(51) Int. Cl.[7] .................................................. H04M 3/00
(52) U.S. Cl. .......................... 379/265.09; 379/265.13; 379/273
(58) Field of Search ............................... 379/265, 266, 379/309, 212

(56) References Cited

U.S. PATENT DOCUMENTS

| | | | |
|---|---|---|---|
| 4,440,986 A | | 4/1984 | Thorson |
| 4,488,294 A | | 12/1984 | Christensen et al. |
| 5,060,140 A | | 10/1991 | Brown et al. |
| 5,142,622 A | | 8/1992 | Owens |
| 5,311,577 A | | 5/1994 | Madrid et al. |
| 5,402,474 A | | 3/1995 | Miller et al. |
| 5,414,762 A | | 5/1995 | Flisik et al. |
| 5,479,487 A | | 12/1995 | Hammond |
| 5,513,328 A | | 4/1996 | Christofferson |
| 5,526,413 A | | 6/1996 | Cheston, III et al. |
| 5,557,667 A | * | 9/1996 | Bruno et al. ............. 348/14.01 |
| 5,563,937 A | * | 10/1996 | Bruno et al. ................. 379/201 |
| 5,586,175 A | | 12/1996 | Hogan et al. |
| 5,742,675 A | * | 4/1998 | Kilander et al. ............. 379/265 |
| 5,884,032 A | | 3/1999 | Bateman et al. |
| 5,915,010 A | * | 6/1999 | McCalmont ................ 379/212 |
| 5,915,012 A | * | 6/1999 | Miloslavsky ................ 379/220 |
| 5,923,745 A | * | 7/1999 | Hurd .......................... 379/220 |
| 5,937,051 A | * | 8/1999 | Hurd et al. .................. 379/212 |
| 5,943,399 A | | 8/1999 | Bannister et al. |
| 5,946,387 A | | 8/1999 | Miloslavsky |
| 6,046,762 A | * | 4/2000 | Sonesh et al. ................ 348/16 |
| 6,058,163 A | * | 5/2000 | Pattison et al. ............... 379/34 |
| 6,058,435 A | * | 5/2000 | Sassin et al. ............... 709/305 |
| 6,104,801 A | * | 8/2000 | Miloslavsky ................ 379/219 |
| 6,246,759 B1 | * | 6/2001 | Greene et al. ........ 379/212.01 |

OTHER PUBLICATIONS

PCT International Search Report, PCT/US00/21336, Dec. 6, 2000, 3 pp.
Digital, Computer Integrated Telephony (CIT) Linking Voice Switches to Digital Computers, 104 pp.
IBM, CallPath Services, Programmer's Reference, First Edition (Nov. 1990), 59pp.

* cited by examiner

*Primary Examiner*—Ahmad F. Matar
*Assistant Examiner*—Hector Agdeppa
(74) *Attorney, Agent, or Firm*—Blakely, Sokoloff, Taylor & Zafman LLP

(57) ABSTRACT

A contact routing system is disclosed comprising: a plurality of media connectors which receive incoming customer contacts from an equal plurality of media channels; and contact routing logic which routes the incoming contacts to particular customer service representatives ("CSRs") based on the particular media channel over which the contacts were received and the skill sets of the CSRs.

Also described is a method for routing customer contacts comprising the steps of: receiving incoming customer contacts from a plurality of media channels; and routing the incoming customer contacts particular customer service representatives ("CSRs") based on the media channel over which the contacts are received and the skill sets of the particular CSRs.

58 Claims, 8 Drawing Sheets

| Field name | Description |
|---|---|
| ani | Automatic Number Identification. Caller's 10-digit telephone number. (Billing number if multi-lines.) |
| ani_type | A single character to categorize the caller's ANI:<br>H = Home<br>B = Business<br>U = Unknown |
| call_ref_id | A unique number that keys the EDU to a phone call. This may be a switch-defined call reference number. |
| caller | The caller's name. |
| createtime | Date and time the EDU was created. |
| dnis | Dialed Number Identification Service. Call recipient's telephone number or extension. |
| duration | The number of seconds between EDU creation and the point at which the EDU Server recognized that there was no activity in the EDU. |
| endreason | Set to 'normal' for a normal termination |
| endtime | The date and time of the first successful termination of the EDU. |
| loginid | The call center agent's name. |
| Field name | Description. |
| owner | The UUID of the session for which this EDU is considered important (historical). |
| termination | A string representing the reason for the EDU's termination:<br>    Normal<br>    Overflow<br>    Expired<br>    Exit |
| transfercount | The number of times the EDU has been transferred since it was created. |
| vdu_id | A string that uniquely identifies an EDU. |
| L_ucid | Universal Call ID |
| iidigits | The digits found in the "originating line information" field supplied by the switch. |
| lai_dnis | The "LookAhead Inferflow" digits found in route-to messages from the switch. |

FIG. 4

CONTACT ROUTING SYSTEM AND METHOD

BACKGROUND OF THE INVENTION

1. Field of the Invention

This invention relates generally to the field of data processing systems. More particularly, the invention relates to a system and method for coordinating, integrating, and routing various types of customer information in a network environment.

2. Description of the Related Art

Today's competitive business environment has increased the importance of customer service. In many industries, the "best" company is determined by the service it provides its customers. In many cases, the customer's primary interface with the company is the telephone. Depending on the particular business, incoming customer calls are typically serviced by some type of automated call center, configured to perform both outbound calling and inbound calling operations.

For many years call centers operated with separate telephony and computer systems to process customer information. Call center employees would answer the telephone and, based on information provided by the caller, would access an application on a host computer (e.g., a customer database). With recent advances in computer-telephony integration, however, information about an incoming call may now be automatically provided by the Central Office to the company's private branch exchanges (hereinafter "PBX"). This information can be used to automatically access host applications (e.g., customer database records) to obtain customer profiles.

One such system is known as an automatic number identification (hereinafter "ANI") system. ANI systems are designed to detect special signals associated with inbound calls which identify the phone number of the calling party. Since the signal can uniquely identify the calling party, the call can then be routed to a specific agent or interactive voice response (hereinafter "IVR") application uniquely tailored to the needs of the particular caller.

In addition, new communication channels have developed in recent years (due in part to the explosive growth of the Internet), providing a variety of ways for customers to communicate with call centers. For example, modern call centers are expected to support customer inquiries via voicemail, email, fax, voice over IP, web chat & collaborative browser media, in addition to the traditional voice over PSTN service.

One problem which confronts modern call centers is how to organize and route the vast amount of information transmitted through each of these communication channels. Many prior art systems have taken a somewhat piecemeal approach, treating each of these communication channels as separate and distinct. Although some progress has been made in developing integrated computer-telephony call systems (see, e.g., Hammond, U.S. Pat. No. 5,479,487), a fully comprehensive customer tracking system which operates seamlessly across a variety of communication media types has yet to be developed.

SUMMARY OF THE INVENTION

A contact routing system is disclosed comprising: a plurality of media connectors which receive incoming customer contacts from an equal plurality of media channels; and contact routing logic which routes the incoming contacts to particular customer service representatives ("CSRs") based on the particular media channel over which the contacts were received and the attributes of the CSRs.

Also described is a method for routing customer contacts comprising the steps of: receiving incoming customer contacts from a plurality of media channels; and routing the incoming customer contacts particular customer service representatives ("CSRs") based on the media channel over which the contacts are received and the skill sets of the particular CSRs.

BRIEF DESCRIPTION OF THE DRAWINGS

A better understanding of the present invention can be obtained from the following detailed description in conjunction with the following drawings, in which:

FIG. 4 illustrates an exemplary set of variables used in one embodiment of the invention.

DETAILED DESCRIPTION OF THE PREFERRED EMBODIMENT

What is needed is a contact tracking and routing system which seamlessly ties together and routes contact information across a variety of communication media. What is also needed is a contact tracking and routing system which is capable is routing contact data (e.g., incoming telephone calls, emails, web chat . . . etc) to an appropriate customer service agent. What is also needed is a contact tracking and routing system which routes contact data to an agent based on a plurality of routing variables, including, but not limited to the customer's contact history, the customer's business value, and the attributes (e.g., skill sets, proficiency levels . . . etc) of a particular customer service agent both in terms of product specialty and in terms of the agent's ability to handle data from different communication channels. What is also needed is a system which may be uniquely tailored to the needs of a particular call center and which will operate in conjunction with currently available call center systems (e.g., PBX systems which implement ANI and/or IVR).

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of the present invention include various steps, which will be described below. The steps may be embodied in machine-executable instructions. The instructions can be used to cause a general-purpose or special-purpose processor, which is programmed with the instructions to perform certain steps. Alternatively, these steps may be performed by specific hardware components that contain hardwired logic for performing the steps, or by any combination of programmed computer components and custom hardware components.

Elements of the present invention may be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

AN EXEMPLARY NETWORK ARCHITECTURE

Figure 1:
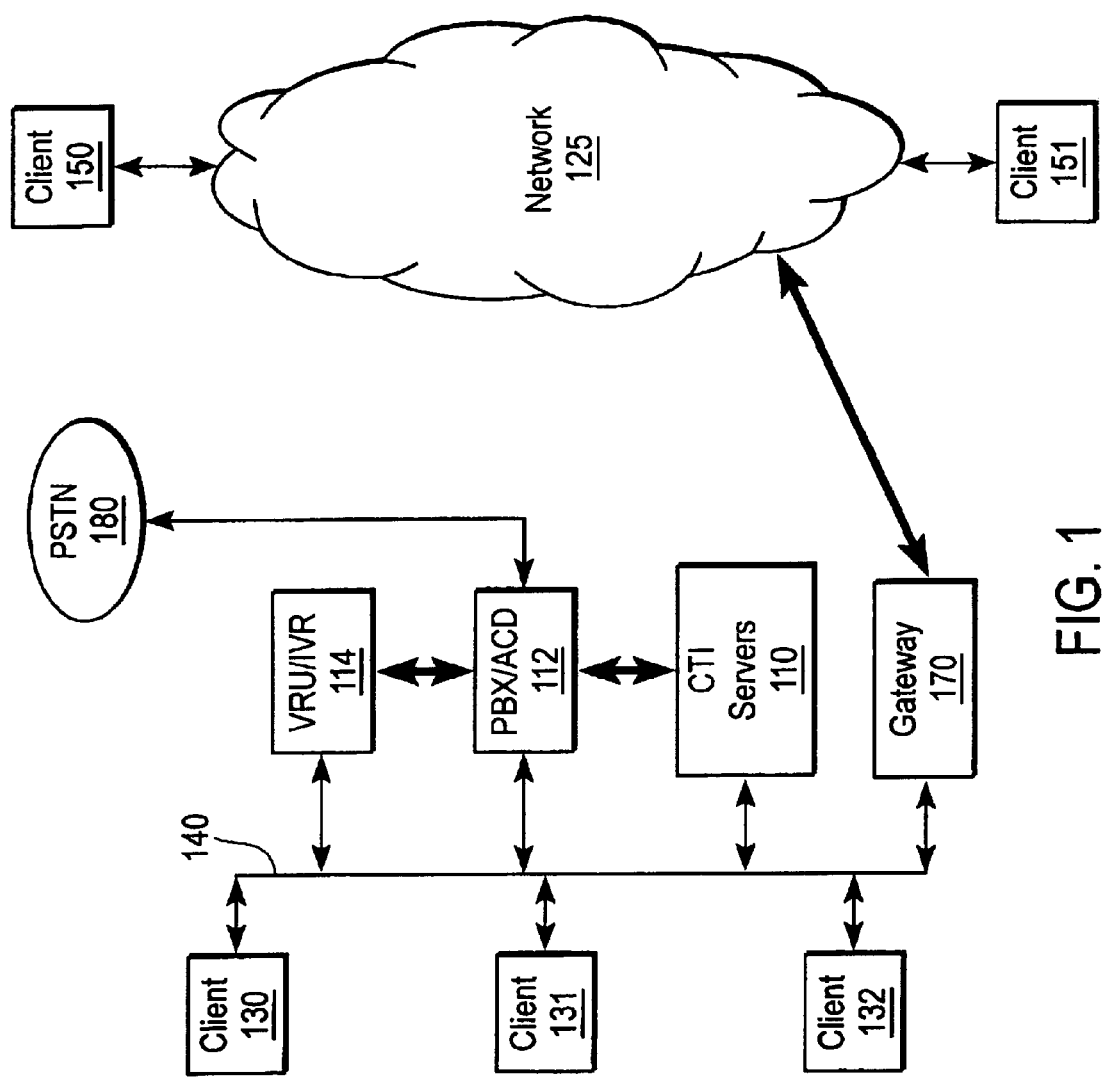
FIG. 1 illustrates an exemplary network architecture used to implement elements of the invention.

Elements of the present invention may be included within a client-server based system 100 such as that illustrated in FIG. 1. According to the embodiment depicted in FIG. 1, one or more computer telephony integration (hereinafter "CTI") servers 110 communicate with a plurality of clients 130–132; 150–151. The clients 130–132; 150–151 may transmit and receive data from the one or more CTI servers 110 over a variety of communication media including (but not limited to) a local area network 140 and/or a larger network 125 (e.g., the Internet). Alternative communication channels such as wireless communication via satellite broadcast (not shown) are also contemplated within the scope of the present invention.

CTI Servers 110 may include a database for storing information needed to make customer routing determinations. This may include specific customer data (e.g., client account information and client preferences) and/or more general transaction data (e.g., the current rates for a particular product or service). The database on CTI Servers 110 in one embodiment runs an instance of a Relational Database Management System (RDBMS), such as Microsoft™ SQL-Server, Oracle™ or the like.

A user may interact with and receive feedback from CTI Servers 110 using various different communication devices and/or protocols. According to one embodiment, the user logs in to one or more of the CTI Servers 110 via client software. The client software may include a browser application such as Netscape Navigator™ or Microsoft Internet Explorer™ on the user's personal computer which communicates to CTI Servers 110 via the Hypertext Transfer Protocol (hereinafter "HTTP"). In other embodiments included within the scope of the invention, clients may communicate with CTI Servers 110 via cellular phones and pagers (e.g., in which the necessary communication software is embedded in a microchip), handheld computing devices, and/or touch-tone telephones.

CTI Servers 110 may also communicate over a larger network (e.g., network 125) to other computers (e.g., clients 150–151) via a network gateway 170. This may include, for example, customers communicating to the call center over network 125 and using various Internet protocols such as e-mail (e.g., the Simple Mail Transport Protocol), Usenet newsgroups (e.g., the Network News Transport Protocol), or Hypertext Transfer Protocol (HTTP).

CTI servers 110 in one embodiment of the system and method communicate with and control one or more Private Branch Exchange/Automatic Call Distribution (hereinafter "PBX/ACD") units 112. The PBX/ACD unit 112 receives and routes incoming and outgoing telephone calls from a public switched telephone network (hereinafter "PSTN") 180. For example, when an incoming call is received at PBX/ACD 112, CTI servers 110 may route the call to a particular customer service agent based on a predefined set of routing rules (described in more detail below).

When a call is transferred to a particular customer service agent, CTI servers 110 may automatically transfer customer information (e.g., customer account data, number of previous customer calls, results of previous calls . . . etc) to a client computer (e.g., client 130) at which the particular agent is stationed (e.g. "logged in"). PBX/ACD unit 112 may also utilize an ANI system to automatically identify the calling party upon receipt of an incoming call, and may use this information to retrieve customer data and route the call accordingly.

One embodiment of the system and method may also include an Interactive Voice Response (hereinafter "IVR") unit 114 (also known as a voice response unit, "VRU"). An IVR unit allows callers to access computer resident data (e.g., account balances, stock prices . . . etc) through a standard telephone. The IVR unit allows the caller to query for data using touch tone signals, and returns the results of the query as spoken words. The IVR system may be used in conjunction with the PBX/ACD system so that by the time a call is routed to a customer service agent, the caller has already identified himself and/or the reason why he is calling. This information may then be automatically displayed on the agent's computer (e.g., client 130) as the agent receives the call.

AN EXEMPLARY COMPUTER ARCHITECTURE

Figure 2:
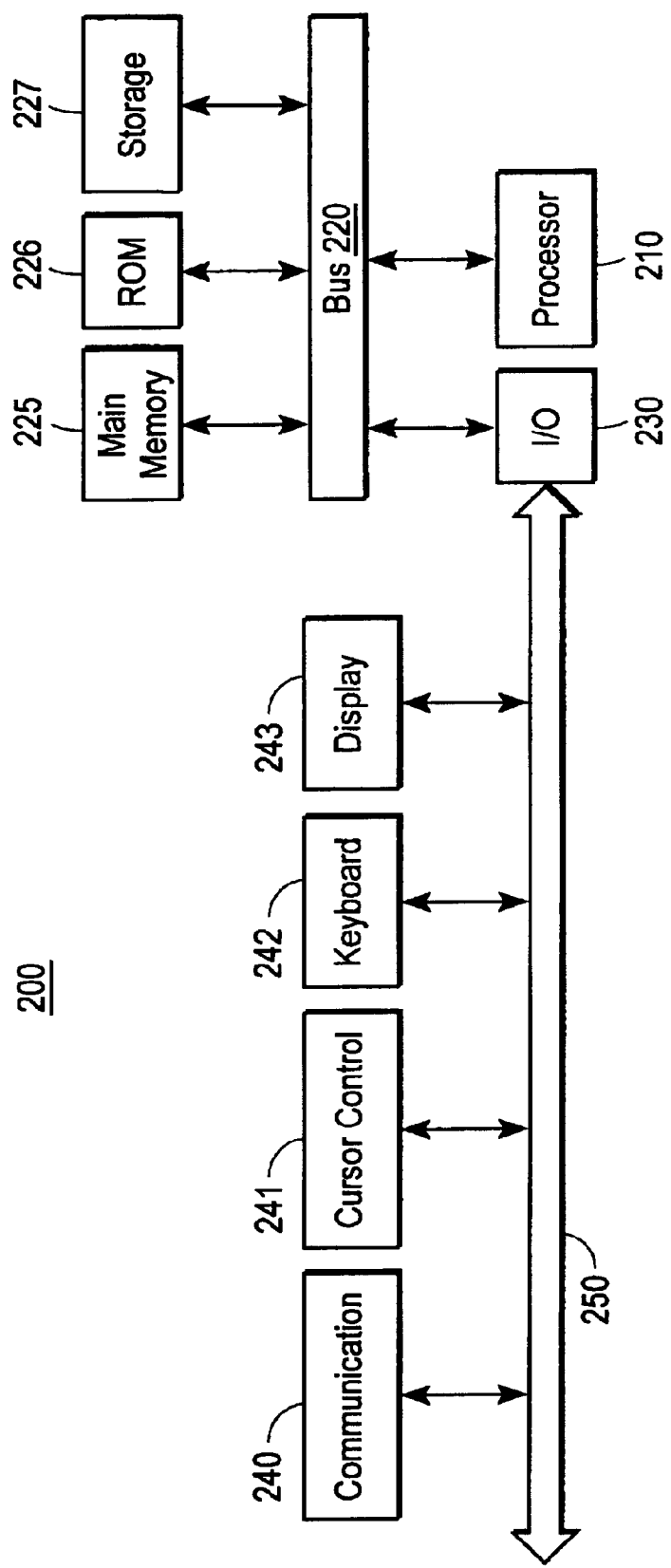
FIG. 2 illustrates an exemplary computer architecture used to implement elements of the invention.

Having briefly described an exemplary network architecture which employs various elements of the present invention, a computer system 200 representing exemplary clients 130–132; 150–151 and/or servers (e.g., CTI Servers 110), in which elements of the present invention may be implemented will now be described with reference to FIG. 2. One embodiment of computer system 200 comprises a system bus 220 for communicating information, and a processor 210 coupled to bus 220 for processing information. Computer system 200 may further comprise a random access memory ("RAM") or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via and I/O interface 230. A plurality of I/O devices may be coupled to I/O bus 250, including a display device 243, an input device (e.g., an alphanumeric input device 242 and/or a cursor control device 241). For example, graphical depictions of calculations and other types of data may be presented to the user on the display device 243.

The communication device 240 may be used to access remote servers, such as server 110, or other computers (e.g., clients 150–151) via a network (e.g., network 125). The communication device 240 may comprise a modem, a network interface card, or other well known interface device, such as those used for coupling to Ethernet, token ring, or other types of networks. In any event, in this manner, the computer system 200 may be coupled to a number of servers via a conventional network infrastructure, such as the call center's local area network 140 and/or a larger network 125, for example.

ONE EMBODIMENT OF THE CONTACT TRACKING AND ROUTING SYSTEM & METHOD

One embodiment of the system and method includes a robust set of coordination and personalization services designed to collect information about the customer, the interaction, and the available customer service and network resources in order to determine the optimal contact routing strategy. Business rules may be developed which use a variety of routing variables including, for example, customer contact history across all media types, customer service representative (hereinafter "CSR") availability and skills, contact volumes, compliance requirements, and contact center operational objectives to optimally route contacts consistently and independent of media type.

Figure 3:
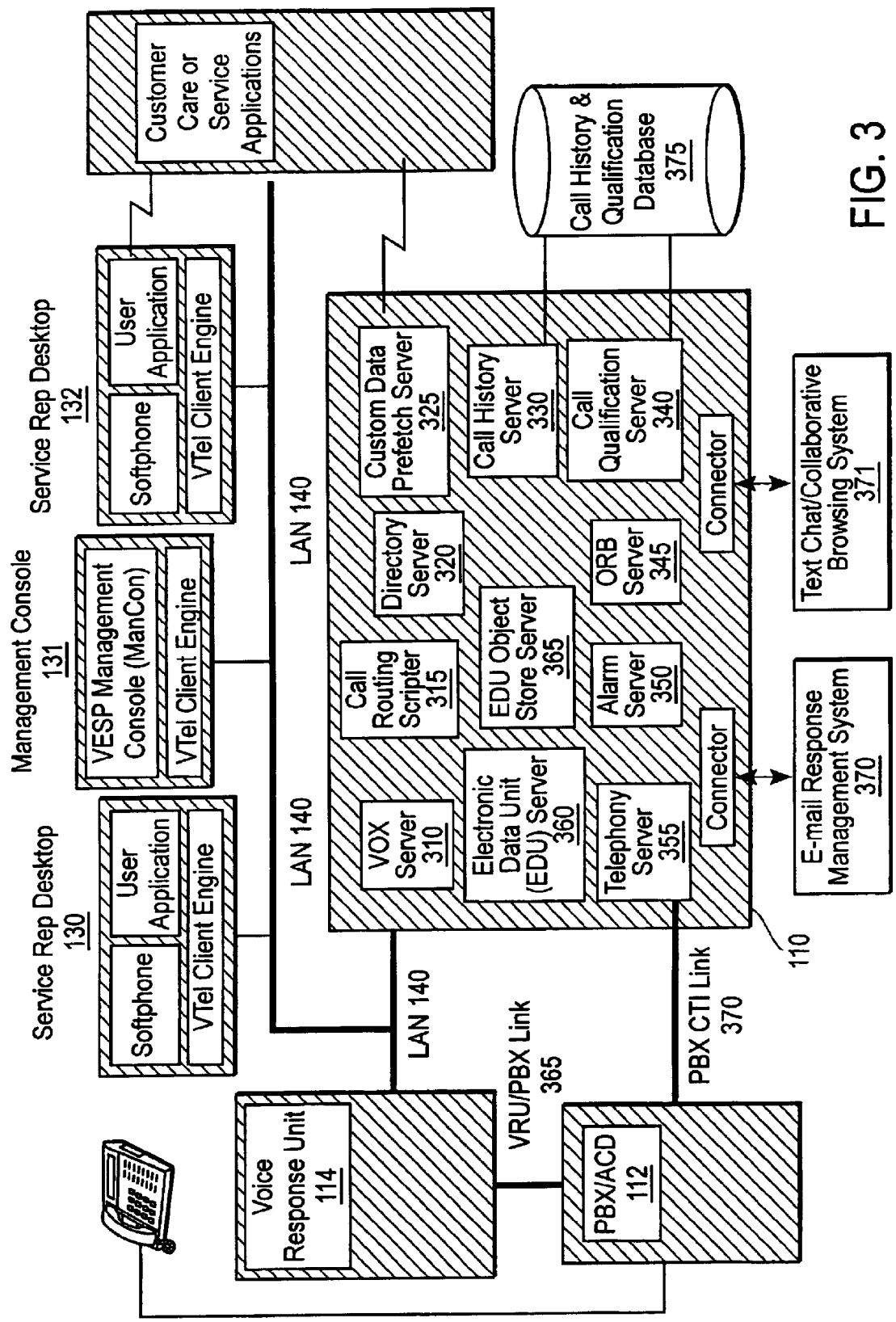
FIG. 3 illustrates a more detailed network architecture used to implement one embodiment of the invention.

FIG. 3 illustrates CTI servers 110 which perform various elements of the foregoing routing functionality. The VOX server 310 encapsulates communications and acts as an interface between the voice response unit (hereinafter "VRU") 114 and the remaining CTI servers 110. The VOX server 310 may be configured to interface with VRU units 114 from a variety of VRU vendors including, for example, AT&T™ (Conversant™), Brite Perception,™ SYNTELLECT,™ Intervoice,™ Periphonics,™ and Voicetek.™ Depending on the particular configuration, the VOX server 310 invoke custom scripts (e.g., generated by the call center) stored on call routing scripter server 315.

The directory server 320 maintains directory information for the call center. This may include server information such as server and program location; and customer service representative ("CSR") authentication information such as login ID, security clearance, and default terminal and phone set. In addition, CSR attributes (e.g., skill sets, proficiency levels, etc.) and media types (i.e., whether a particular CSR is capable of handling e-mail contacts) may be stored on directory server 320.

The telephony server 355, as described above, controls the PBX/ACD unit 112 and acts as an interface between the PBX/ACD unit 112 and the rest of the system.

The Electronic Data Unit

In one embodiment of the system and method, an Electronic Data Unit server 360 records each individual contact a customer makes with the call center in a specific data format referred to herein as an Electronic Data Unit ("EDU"). The EDU contains the information that enables the described system and method to coordinate customer contact activities across the call center's network (e.g., networks 140 and 125).

In addition to uniquely identifying each contact, the EDU collates information about activity performed on behalf of the contact and updates that information as the contact traverses the call center. For example, a typical EDU might contain the time the call arrived at the PBX, the transfers between agents, the time the call concluded, as well as the customer service actions performed by the agent.

In one embodiment of the system and method, there are three stages in the lifecycle of a EDU: creation, activity, and termination. Each stage is discussed in this section.

EDU Creation. Every contact, whether inbound or outbound, must have a corresponding EDU. Whenever an inbound call arrives at a telephone on the PBX/ACD unit 112, or a call center agent dials out, the Telephony Server 355 signals the EDU server 360 to create a new EDU. In response, the EDU Server 360 creates an EDU and returns its unique identifier ("eDUID") to the Telephony Server 355.

EDU Activity. The EDU is a real-time storage device that collects strings of text from multiple sources. During its life, the EDU's dual job is to collect the factual information (e.g., {name, value} data couples) entered by the call center agent or automated software, and to notify assigned clients of changes to the EDU.

Any application that wishes to interact with an EDU, or with its associated contact, has to request it by its unique eDUID identifier. Upon request, the EDU server 360 passes the eDUID out to other servers/processes, thus enabling applications to ask for access to the EDU and the telephone call. Through this mechanism, the data and contact logically associated with the EDU can be routed to other software processes in the call center network. Each call is uniquely identified and that identifier stays with the contact throughout its sojourn through the contact routing system, allowing the coordination of call and data processing.

The EDU Server 360 may also be configured to watch for EDUs that contain certain values. If any EDU matches the specified criteria, the EDU Server 360 may issue event messages (which contain the eDUID) to interested clients (e.g., service representative client 130).

Typically, clients want to examine EDU contents, modify EDU values, receive event notifications when EDU contents change, transfer EDUs or terminate an EDU. These activities are supported through various method invocations. For example, a client could invoke a predefined Get method ("GetOneValue") ("GetSomeValues"), and so on) to ask the EDU Server to return values in an EDU. The data contained within an EDU's can be modified under several circumstances, such as when clients 130–132 invoke methods to incorporate data into an EDU.

EDU Termination. When a telephone conversation ends, generally so does the need for the EDU associated with the call. The call center agent may need to enter wrap up information in the contact record, but afterward the EDU may be closed. When all interested clients have terminated their interest in an EDU, the EDU can optionally be archived in the Call History Server 330 and/or EDU Object Store Server 365 databases. When this occurs, the EDU may be purged from the EDU Server 360.

Before an EDU can be closed, the EDU Server 360 must first verify that all network processes are done with it. For each EDU, the EDU Server 360 maintains an internal list of processes that have read, transferred, or modified the EDU. Any process that invokes a method using the EDU's eDUID is added to the list. When a client invokes a termination method (e.g., "EDU.Terminate( )"), the client's name is removed from the list. Once the list is empty, the EDU may be terminated.

Whether a particular embodiment of the call routing system passes the terminated EDU to the Call History Server 330 and/or the EDU Object Store Server 365 depends on how the system is configured. The database structure of each of these servers differs to accommodate their intended uses.

The EDU Object Store Server 365 in this embodiment is designed for quick retrieval of an EDU as an integral unit. It allows easy retrieval of EDUs that have been retired from the EDU Server 360. The EDU Object Store Server 360 stores the entire sequence of values to which the EDU elements have been set throughout the life of that EDU, including information such as who set the value and when it was set.

The EDU Object Store Server 365 may be used to store EDUs that are terminated in a particular (e.g., non-conventional) manner. For example, safeguards built into the EDU Server 360 may terminate "suspicious" EDUs, that is, those that appear to have been lost. Any EDU that has been idle for an extended period (e.g., thirty minutes) may thereby be automatically terminated. In such a case, EDU Object Store Server 365 may be used to temporarily store the EDU for a predetermined amount of time (e.g., until there is a greater certainty that the call is actually completed). Accordingly, if it turns out that the call is still active, the EDU will be readily available for CSR wrap-up.

By contrast, the Call History Server 330 database in one embodiment is designed primarily for retrieval of data by client applications (e.g., client 130) for reporting. Once an EDU is sent to this server it may not be easily reconstructed and reactivated by the EDU server 360. Rather, the Call History Server 330 in this embodiment stores a snapshot of the EDU as it existed at the moment it was terminated; it may store only one value for each data element.

In one embodiment of the system, terminated EDUs may always be sent to the EDU Object Store Server 365 for a predetermined amount of time before (or concurrently with) being sent to the Call History Server 330. In this way, the EDU Object Store Server 365 acts like a "cache" for storing recently terminated EDUs in case reactivation is necessary. Alternatively, the EDU Object Store Server 365 may be used to store EDUs of high priority clients so that the EDU data is readily accessible.

In one embodiment of the system, EDU data consists of series of sequenced {name, value} couples that represent information about a call. For example, the name/value pair {ani, 8008863244} represents the telephone number of an incoming call. The field name "ani" is the name data element and 8008863244 is the value assigned to the field. Applications may access EDU data by references to the field names. An exemplary set of EDU variables are illustrated in FIG. 4.

The EDU server sets certain name/value data pairs, such as the eDUID. Innumerable additional name/value data pairs may be constructed into the EDU for a particular application. Since the EDU can accept input from a variety of sources, data could be transmitted from the PBX/ACD unit 112, other servers (e.g., a customer's e-mail server), or the agent's application (e.g., running on client 130). Typical additional entries may include the agent's login ID, the call's start time, and various service codes. Changes to all data values may be recorded, including information on who made the change and when the change was made.

Contact Routing

Figure 5:
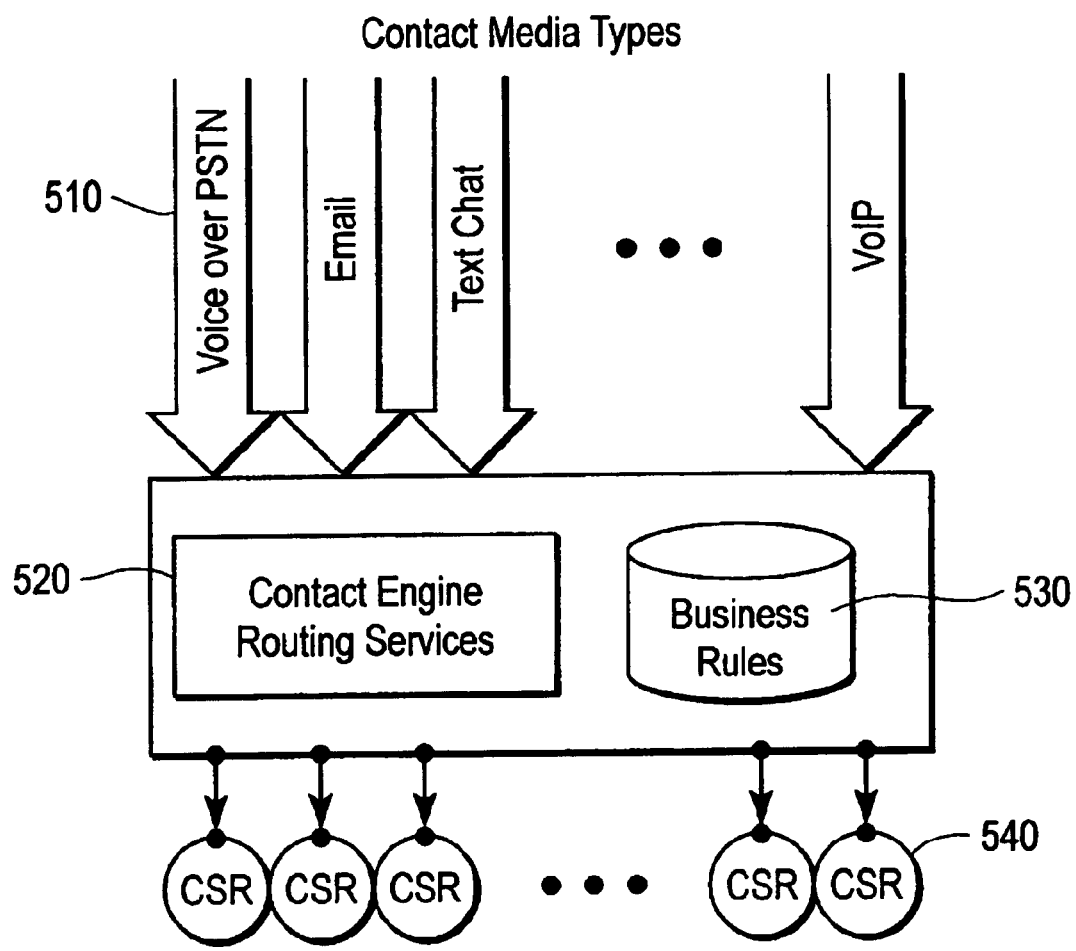
FIG. 5 illustrates a contact routing scheme implemented in one embodiment of the invention.

One embodiment of the system and method is illustrated in FIG. 5. In this embodiment, customer contact data is received from a variety of communication media types 510. In this embodiment, a new EDU may be generated for each individual customer contact, regardless of the media type through which the contact is sent. A contact engine routing services module (hereinafter "Contact Engine," or "eContact Engine") 520, employing a different media connector (i.e., interface) for each media type, applies a predefined set of business rules 530 to route the contact data 510 to customer services representatives 540 in an "optimal" way. Factors which may be considered in determining this "optimal" routing strategy include, for example, customer intent (e.g., the purpose for the contact), the customer history, the customer business value, the skills of each of the CSRs, current CSR tasks (e.g., which CSRs are available), and CSR geographic location. New business rules 530 may be uniquely tailored to meet the specific needs of a system user.

One embodiment of the system uses a multi-stage routing process to route contact data to a particular CSR. In this embodiment, the first stage of routing for a newly arrived contact occurs within the individual media connectors (i.e., the individual media channels within the contact engine 520). The media connector identifies the caller or the caller intent using techniques like ANI for PSTN voice calls, caller entered digits in a VRU, or the "From" or "Subject" fields in an e-mail header. The contact engine 520 then augments the connector's native capabilities to route the contact to a logical agent group within the connector, based on the particular set of business rules 530 in place.

Because this embodiment of the system and method operates across all media types, this initial routing decision may be based on the entire customer contact history. Accordingly, complex routing decisions can be made such as "this voice contact caller sent us an e-mail last week about a problem with his refrigerator, so we should route this call to the group that handles problems with major appliances" (see, e.g., FIG. 7).

Once the contact is routed to the appropriate queue within the media connector, the connector will use its native contact distribution mechanisms to route the contact to an available CSR. This is where the second stage of routing occurs. The contact engine 520 performs "multimedia blending" by controlling agent availability and agent assignment across the multiple media connectors. Agent blending can be performed on a contact-by-contact basis, or a CSR can be transferred between media connectors (e.g., moved from e-mail contacts to voice contacts) based on business rules such as time-of-day or contact volume thresholds. Agent blending rules offer great flexibility. For example, a CSR may be allowed to service only one media type, or several media types, based on CSR skills stored in the directory server 320.

Additionally, blending can be controlled using business rules. For example, "voice contacts cannot be interrupted by any other media types," or "e-mail contacts can be interrupted by web chat but not voice media types." A variety of similar agent blending rules may be implemented within the scope of the present invention.

Figure 6:
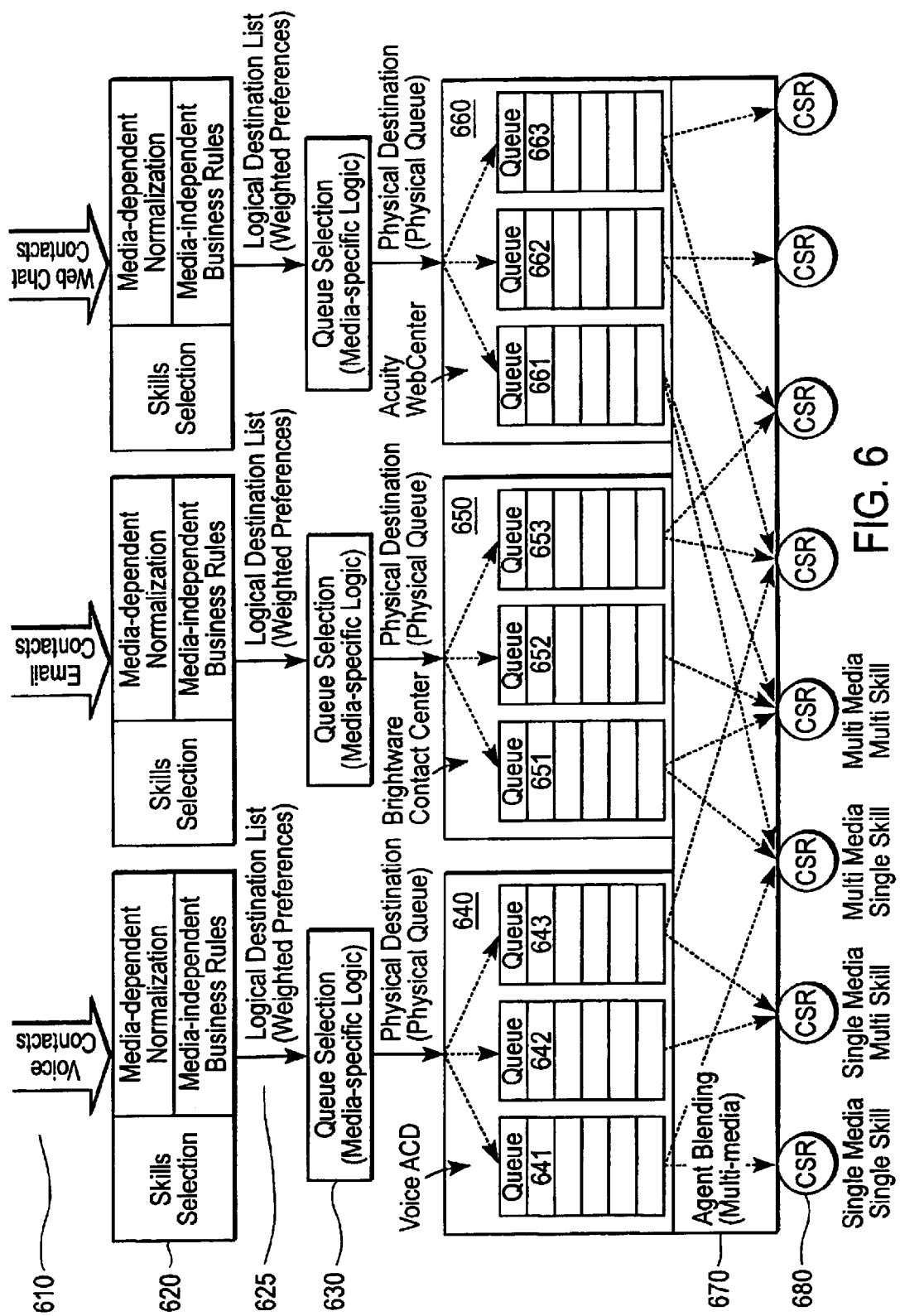
FIG. 6 illustrates a more detailed contact routing scheme implemented in one embodiment of the invention.

A more detailed view of a contact routing system and method will be described with reference to FIG. 6. As previously stated, one basic requirement for the contact engine 520 is to accept contacts across several media types 620, and to present the contacts to CSRs 680 in an "optimal" way, with "optimal" defined by user-specified business rules.

This process may be broken down into the following steps:

Skills Selection. At 620, the information provided by the media connector may be used to identify the customer, and may then be combined with historical data about the customer in order to determine the customer's intention. A decision can then be made as to how to treat the customer, and to identify the CSR skills that are required to provide appropriate treatment. The output 625 of this step is an ordered list of logical skills or CSR attributes desired to handle this contact.

It should be noted that although the high-level business rules applied in this step are the same for all media types, the details of how a customer is identified may be media-specific (e.g., ANI, e-mail "From," text chat cookie . . . etc).

Queue Selection. The next step 630 translates this logical specification of desired skills into a physical queue. In the embodiment of FIG. 6, each media-specific queue group 640, 650, and 660 is comprised of three queues 641–643, 651–653, and 661–663, respectively. It should be noted, however, that different numbers of queues may be implemented without departing from the underlying principles of the present invention. In an embodiment of the system where the call center is a single-site installation, this step may not be required, as a skill may map directly to a single queue.

For some of these queues, the services provided may represent a good match to those requested, while other queues may provide the requested services at a lower proficiency level. The queue selection logic 630 evaluates skill match, and applies rules that factor in routing variables such as estimated queue wait time, service level requirements for the particular customer, and perhaps the cost of transferring the contact from one location to another (i.e., if the call center is multi-site), and selects the physical queue that best satisfies these requirements.

Some of the foregoing variables may be broken down further into sub-variables. For example, the service requirements for a particular customer may be based on the number of previous time the customer has called in on a particular issue, the product purchased by the customer, and/or the quantity of goods/services that the customer purchased.

In a multi-site telephony system, the queue selection function might be performed within the ACD (i.e., using ACD vendor-specific features). Even if there are several geographically distinct locations within the contact center, however, certain media types such as e-mail may be considered single-site if a single queuing and distribution point is configured.

Agent Blending. At this point in the process, one or more queues of contacts are allocated for each media type. Each of the different media types is independently performing contact distribution to a set of agents 680 known by the connector, and available to receive contacts (e.g., agents that are logged in and not busy). The agent blending logic 670 of the routing system and method controls agent visibility and availability across all media types, thereby controlling which contacts from which media types are to be allocated and the number of concurrent contacts to be presented to each CSR 680.

The agent blending logic 670 sits between the CSRs 680 and each of the media connectors 640–642. Agent visibility and availability are controlled in media-specific (and in the case of voice ACDs, device-specific) ways. For example, single-media CSRs are visible to just one media connector, while multi-media CSRs are visible to more than one connector. Business rules for concurrent contacts are applied to control the CSR availability to each media type, depending on the CSRs current contact workload.

Figure 7:
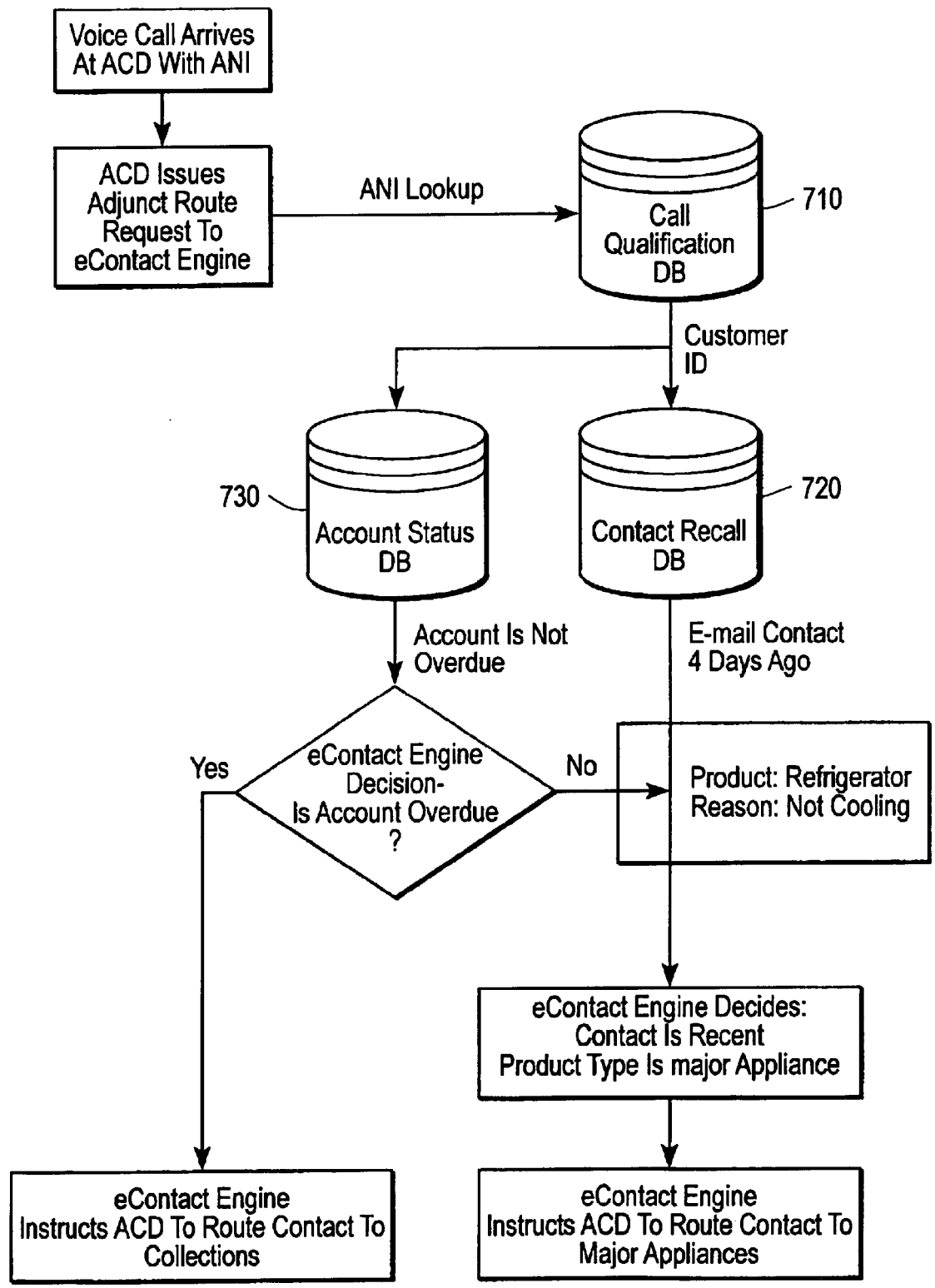
FIG. 7 illustrates a routing method implemented in one embodiment of the invention.
Figure 8:
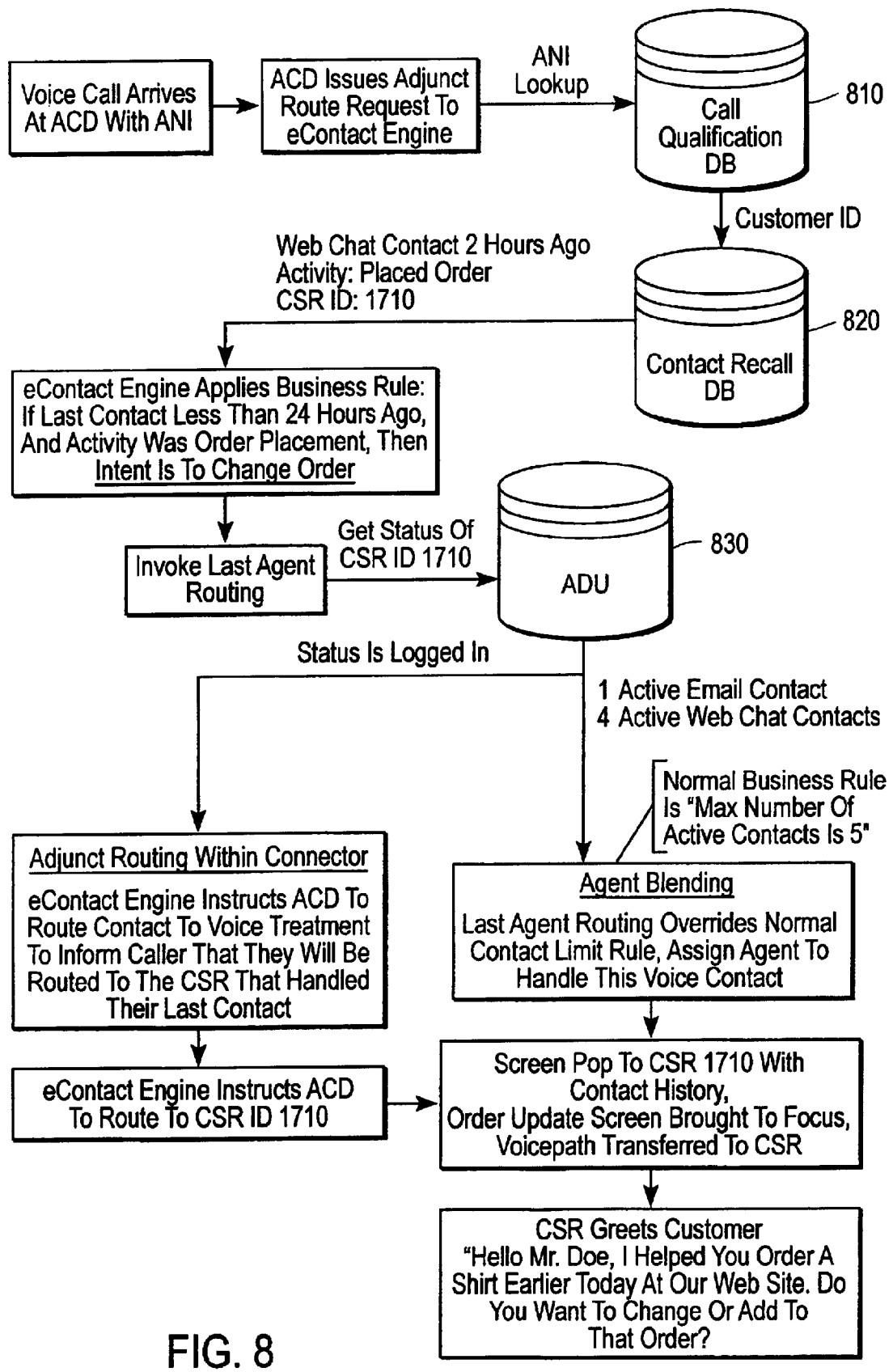
FIG. 8 illustrates a routing method implemented in one embodiment of the invention.

FIGS. 7 and 8 are flowcharts illustrating how contact data may be routed in different embodiment of the system and method. In FIG. 7 the routing system initially performs an ANI check on an incoming call in a call qualification database 710 (see also element 375 in FIG. 3) and determines that the customer sent an e-mail to the call center only four days earlier. One embodiment of the system accomplishes this by retrieving the e-mail EDU from the contact database (e.g., the call history & qualification database 710, 375 or the EDU object store server 365 database, depending on the configuration). Concurrently, the system checks an account status database 730 to determine whether the customer's account is overdue. If it is, then the call is routed to a CSA who handles collections on overdue accounts. If it is not, then—after retrieving the contact data from a contact recall database 720 using the customer ID—the call is routed to an appropriate CSR who handles calls on major appliances (e.g., a CSR in a "major appliance" group).

Similarly, in FIG. 8, the system initially performs an ANI lookup on an incoming call with a call qualification database 810 and uses the resulting customer ID to search a contact recall database 820. In one embodiment, the call qualification database 810 and/or the contact recall database 820 contains an EDU which indicates that the customer made a web chat contact with the call center (or sales department) two hours earlier. The system determines that the customer placed an order and identifies the CSR who performed transaction. The contact engine 520 then applies a predefined business rule 530: "if last contact was less than 24 hours earlier, and activity was order placement, then intent is to change order." As a result, a "last agent routing" routine is invoked which attempts to reconnect the customer to the CSR with whom the order was initially placed. The status of the particular CSR is then checked in the agent data unit ("ADU") database 830 where the system determines that the CSR is logged in and currently has 1 active e-mail contact and 4 active web chat contacts (i.e., the CSR in this example receives contacts across multiple media channels).

The contact engine 520 then instructs the ACD unit to inform the caller that they will be routed to the CSR who handled their last contact with the call center and routes the call to the appropriate CSR (with ID No. 1710 in the example). In the specific example illustrated in FIG. 8, the "last agent routing" function overrides one of the business rules (i.e., "maximum number of active contacts is five") to route the call to the appropriate CSR. Concurrently with receipt of the call from the voice ACD media connector 640, the CSR receives at his terminal the customer's contact history data which has been retrieved from one or more routing system databases (e.g., the call history server 330 database, the EDU object store server 365 database, or the contact recall database 820, depending on the system configuration).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, the specific CSR call routing methods illustrated in FIGS. 7 and 8 are merely two of many possible embodiments within the scope of the present invention. Accordingly, the scope and spirit of the present invention should be judged in terms of the claims which follow.

What is claimed is:

1. A contact routing system, comprising:
a plurality of media connectors which receive incoming customer contacts from an equal plurality of media channels;

contact routing logic which routes said incoming contacts to particular customer service representatives ("CSRs") based on a set of routing variables including the particular media channel over which said contacts were received and the skill sets of said CSRs; and a single call tracking data unit created for each incoming customer contact regardless of the medium channel of the customer contact to record data for said incoming customer contact, the call tracking data unit to be archived upon termination of activities associated with the call tracking data unit based on an internally maintained list of processes utilizing the call tracking data unit, said call tracking data unit transmitted to said CSRs concurrently with said routing of said contacts for updating by said CSRs as said contact traverses said contact routing system, regardless of media type handled by said CSRs.

2. The system as claimed in claim 1 wherein some CSRs receive customer contacts from only one media channel and other CSRs receive customer contacts from a plurality of media channels.

3. The system as claimed in claim 2 wherein some CSRs are only routed calls which require a single skill set and other CSRs are routed calls which require multiple skill sets.

4. The system as claimed in claim 1 wherein one of said media channels is e-mail.

5. The system as claimed in claim 1 wherein one of said media channels is text chat over hypertext transfer protocol ("HTTP").

6. The system as claimed in claim 1 wherein one of said media channels is collaborative browsing over HTTP.

7. The system as claimed in claim 1 wherein one of said media types is voice over IP.

8. The system as claimed in claim 1 wherein said call tracking data unit is transferred to a second CSR concurrently with said contact being transferred to said second CSR.

9. The system as claimed in claim 1 wherein said call tracking data unit is closed upon completion of said contact.

10. A method for routing customer contacts comprising the steps of:

receiving incoming customer contacts from a plurality of media channels; and routing said incoming customer contacts to particular customer service representatives ("CSRs") based on a set of routing variables including the media channel over which said contacts are received and the skill sets of the particular CSRs; and routing a single call tracking data unit generated for each incoming customer contact regardless of the medium channel of the customer contact to a plurality of locations in a call center system, said call tracking unit recording data associated with said incoming customer contact, the call tracking data unit to be archived upon termination of activities associated with the call tracking data unit based on an internally maintained list of processes utilizing the call tracking data unit, said call tracking data unit routed concurrently with said routing of said contacts for updating by said CSRs as said contact traverses said call center system, regardless of media type handled by said CSRs.

11. The method as claimed in claim 10 wherein some CSRs receive customer contacts from only one media channels and other CSRs receive customer contacts from a plurality of media channels.

12. The method as claimed in claim 11 wherein some CSRs are only routed calls which require a single skill set and other CSRs are routed calls which require multiple skill sets.

13. The method as claimed in claim 10 wherein one of said media channels is e-mail.

14. The method as claimed in claim 10 wherein one of said media channels is text chat over hypertext transfer protocol ("HTTP").

15. The method as claimed in claim 10 wherein one of said media channels is collaborative browsing over HTTP.

16. The method as claimed in claim 10 wherein said call tracking data unit is transferred to a second CSR concurrently with said contact being transferred to said second CSR.

17. The method as claimed in claim 10 wherein said call tracking data unit is closed upon completion of said contact.

18. A contact routing method comprising:

receiving customer contacts from a plurality of different media channel types;

selecting a particular media-specific queue group for each incoming customer contact based on said media channel over which said customer contact was received;

selecting a particular queue within said selected media-specific queue group for each customer contact based on one or more routing variables;

transmitting said customer contact to a particular CSR based on the skill set of said CSR and the media channels over which said CSR is equipped to receive contacts; and transmitting a single call tracking data unit regardless of the medium channel of the customer contact to a plurality of locations, each call tracking data unit recording data associated with one incoming customer contact, the call tracking data unit to be archived upon termination of activities associated with the call tracking data unit based on an internally maintained list of processes utilizing the call tracking data unit, said call tracking data unit transmitted concurrently with said routing of said contacts for updating by said CSRs as said contact traverses a contact routing center, regardless of media type handled by said CSRs.

19. The contact routing method as claimed in claim 18 wherein one of said routing variables is the service level requirement for each customer contact.

20. The contact routing method as claimed in claim 18 wherein one of said routing variables is the cost of transferring the contact from one call center location to another.

21. The contact routing method as claimed in claim 18 wherein one of said routing variables is an estimated queue wait time.

22. The contact routing method as claimed in claim 18 wherein one of said routing variables is the number of previous customer contacts by the particular customer.

23. The contact routing method as claimed in claim 18 wherein said step of selecting a particular queue is accomplished by an automatic call distribution ("ACD") system.

24. The contact routing method as claimed in claim 18 wherein some CSRs receive customer contacts from only one media channels and other CSRs receive customer contacts from a plurality of media channels.

25. The contact routing method as claimed in claim 24 wherein some CSRs are only routed calls which require a single skill set and other CSRs are routed calls which require multiple skill sets.

26. The contact routing method as claimed in claim 18 wherein one of said media channels is e-mail.

27. The contact routing method as claimed in claim 18 wherein one of said media channels is text chat over hypertext transfer protocol ("HTTP").

28. The contact routing method as claimed in claim 18 wherein one of said media channels is collaborative browsing over HTTP.

29. The contact routing method as claimed in claim 18 wherein one of said media channels is voice over IP.

30. The contact routing method as claimed in claim 18 wherein said call tracking data unit is transferred to a second CSR concurrently with said contact being transferred to said second CSR.

31. The contact routing method as claimed in claim 18 wherein said call tracking data unit is closed and saved upon completion of said customer contact.

32. The contact routing system of claim 18 wherein said call tracking data unit is a storage device that collects strings of text from multiples sources.

33. The contact routing system of claim 18 wherein each call tracking data unit has an identifier.

34. The contact routing system of claim 18 wherein said call tracking data unit includes certain values that are searchable by at least one of said CSR and said customer contact.

35. A contact routing system, comprising:
 a plurality of media connectors which receive incoming customer contacts from an equal plurality of media channels;
 contact routing logic which routes said incoming contacts to particular customer service representatives ("CSRs") based on a set of routing variables including the particular media channel over which said contacts were received and the skill sets of said CSRs; and
 a single tracking data unit created for each incoming customer contact regardless of the medium channel of the customer contact to record data for said incoming customer contact, the call tracking data unit to be archived upon termination of activities associated with the call tracking data unit based on an internally maintained list of processes utilizing the call tracking data unit, the call tracking data unit routed to a plurality of contact center applications that indicate interest in the call tracking data unit, said tracking data unit transmitted to said CSRs concurrently with said routing of said contacts for updating by said applications or CSRs as said contact traverses a contact routing center, regardless of media type handled by said applications or CSRs.

36. The system as claimed in claim 35 wherein some CSRs receive customer contacts from only one media channel and other CSRs receive customer contacts from a plurality of media channels.

37. The system as claimed in claim 36 wherein some CSRs are only routed calls which require a single skill set and other CSRs are routed calls which require multiple skill sets.

38. The system as claimed in claim 35 wherein one of said media channels is e-mail.

39. The system as claimed in claim 35 wherein one of said media channels is text chat over hypertext transfer protocol ("HTTP").

40. The system as claimed in claim 35 wherein one of said media channels is collaborative browsing over HTTP.

41. The system as claimed in claim 35 wherein one of said media types is voice over IP.

42. The system as claimed in claim 35 wherein said call tracking data unit is transferred to a second CSR concurrently with said contact being transferred to said second CSR.

43. The system as claimed in claim 35 wherein said call tracking data unit is closed upon completion of said contact.

44. The contact routing system of claim 35 wherein said call tracking data unit is a storage device that collects strings of text from multiples sources.

45. The contact routing system of claim 35 wherein each call tracking data unit has an identifier.

46. The contact routing system of claim 35 wherein said call tracking data unit includes certain values that are searchable by at least one of said CSR and said customer contact.

47. A contact routing system, comprising:
 a plurality of media connectors which receive incoming customer contacts from an equal plurality of media channels;
 contacting routing logic which applies media-independent business rules, customer contact history, and knowledge of the particular media channel over which said contacts were received to route said incoming contacts to particular customer service representatives ("CSRs") based on the particular media channel over which said contacts were received and the skill sets of said CSRs; and
 a single tracking data unit created for each incoming customer contact regardless of the medium channel of the customer contact to record data for said incoming customer contact, the call tracking data unit to be archived upon termination of activities associated with the call tracking data unit based on an internally maintained list of processes utilizing the call tracking data unit, said tracking data unit transmitted to said CSRs concurrently with said routing of said contacts for updating by said applications or CSRs as the contact traverses said contact center, regardless of media type handled by said applications or CSRs.

48. The system as claimed in claim 47 wherein some CSRs receive customer contacts from only one media channel and other CSRs receive customer contacts from a plurality of media channels.

49. The system as claimed in claim 48 wherein some CSRs are only routed calls which require a single skill set and other CSRs are routed calls which require multiple skill sets.

50. The system as claimed in claim 47 wherein one of said media channels is e-mail.

51. The system as claimed in claim 47 wherein one of said media channels is text chat over hypertext transfer protocol ("HTTP").

52. The system as claimed in claim 47 wherein one of said media channels is collaborative browsing over HTTP.

53. The system as claimed in claim 47 wherein one of said media types is voice over IP.

54. The system as claimed in claim 47 wherein said call tracking data unit is transferred to a second CSR concurrently with said contact being transferred to said second CSR.

55. The system as claimed in claim 47 wherein said call tracking data unit is closed upon completion of said contact.

56. The contact routing system of claim 47 wherein said call tracking data unit is a storage device that collects strings of text from multiples sources.

57. The contact routing system of claim 47 wherein each call tracking data unit has an identifier.

58. The contact routing system of claim 47 wherein said calling tracking data unit includes certain values that are searchable by at least one of said CSR and said customer contact.

* * * * *